COMMUNICATION TECHNIQUE FOR MULTIPATH DISTORTION

Filed June 10, 1959 2 Sheets-Sheet 1

INVENTORS,
DAVID E. SUNSTEIN
BERNARD D. STEINBERG
BY Jacob Trachtman
ATTORNEY.

COMMUNICATION TECHNIQUE FOR MULTIPATH DISTORTION

Filed June 10, 1959 2 Sheets-Sheet 2

INVENTORS.
DAVID E. SUNSTEIN
BERNARD D. STEINBERG
BY Jacob Trachtman
ATTORNEY.

United States Patent Office 3,168,699

Patented Feb. 2, 1965

3,168,699

COMMUNICATION TECHNIQUE FOR MULTIPATH DISTORTION

David E. Sunstein, Bala-Cynwyd, and Bernard D. Steinberg, Wyndmoor, Pa., assignors to General Atronics Corporation, Bala-Cynwyd, Pa., a corporation of Pennsylvania Filed June 10, 1959, Ser. No. 819,374
17 Claims. (Cl. 325—472)

Figure 1:
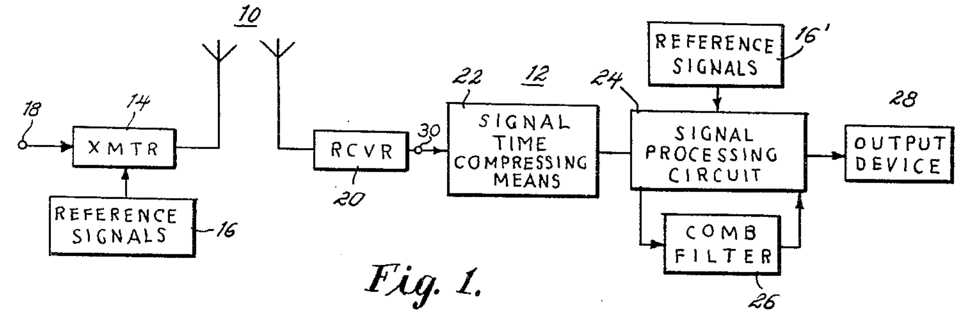

The invention relates to a signal processing apparatus and method, and more particularly to an apparatus and method for processing information signals which have been changed from their original form to derive the information therefrom by use of correlation and multiplexing techniques.

Heretofore, signal processing apparatus has been provided for deriving intelligence from information signals, which have been distorted by transmission through a propagating medium. Such distortion, particularly at certain carrier frequencies, is due to receiving the same signal over a plurality of paths giving multipath distortion, since the various paths may be of different lengths thereby causing the signal to arrive at different times and phase relationships. This results in selective fading caused by the relative radio frequency phases of the signals delivered to the receiver over the various paths. The article, entitled "A Communication Technique for Multipath Channels," by Robert Price and Paul E. Green, Jr., published in the Proceedings of the Institute of Radio Engineers, March 1958, describes in detail a system for deriving information from information signals subject to multipath distortion. In order to achieve its results, the described apparatus called the Rake system utilizes a delay line provided with a plurality of taps for delivering signals to a plurality of respective tap circuits such as that shown in FIGURE 3 of page 558 of said article. Thus, if 50 taps are utilized on the delay line, 50 such tap circuits are provided. This results in a system having a large number of circuits and components many of which are identical.

It is therefore a principal object of the invention to provide a new and improved signal processing apparatus and method requiring a minimum number of circuits and components for achieving the results of the prior art.

Another object of the invention is to provide a new and improved signal processing apparatus and method utilizing a single circuit in place of a plurality of similar circuits used in the prior art for accomplishing the same results.

Another object of the invention is to provide a signal processing apparatus and method utilizing a simple circuit in place of the delay line and plurality of tap circuits required by the prior art.

Another object of the invention is to provide a new and improved signal processing apparatus and method utilizing time multiplexing techniques for replacing a large number of identical circuits or components.

Another object of the invention is to provide a new and improved signal processing apparatus and method having a reduced number of total components, being reduced in size, power consumption, bulk and weight, adapted especially for airborne operations, and having a lower cost for manufacturing and maintaining same over the prior art devices.

Another object of the invention is to provide a new and improved signal processing apparatus and method of high reliability, operating at a high degree of efficiency and at the same speed as prior art devices, while achieving the same results without loss of information and materially reducing the number of components required by utilizing multiplexing techniques.

Another object of the invention is to provide a new and improved signal processing apparatus and method operating sequentially on received information instead of in parallel, but without loss of information, by compressing the information within a shorter time interval.

Another object of the invention is to provide a signal processing apparatus and method providing a compiled record of the current status of the ionospheric transmission medium or distorting factor affecting received information signals.

Another object of the invention is to provide a new and improved signal processing apparatus and method including means for controlling the rate of change of a stored record to average the measured ionosphere characteristics over a sufficient number of samples to compensate for highly transient distorting phenomenon.

Another object of the invention is to provide a new and improved signal processing apparatus and method which compensates for distortion introduced by the ionosphere in an information signal so as to maximize the reliability of deciphering the information signal.

The above objects as well as many other objects of the invention are achieved by providing a signal processing apparatus with a receiver for deriving information signals propagated through a distorting medium such as radio signals propagated through the ionosphere, and a signal time compressing means which receives information signals from the receiver and delivers an output signal comprising a plurality of signals which are delivered during respective intervals which are a fraction of the time interval during which the information signals are received by the receiver. The time compressing means, thus, delivers in a shorter interval of time the information signals received during a longer period of time by the receiver. This is equivalent to rapidly and periodically sampling the signals present along a series of taps on a delay line. The signal delivered by the compressing means is received by a signal processing circuit which also receives one or more reference signals. The signal processing circuit includes a comparator which multiplies the compressed signal by a reference signal and delivers the result to a comb filter which stores this information in time sequenced order. Other reference signals may similarly be delivered to respective comparators, multiplied by the compressed signal and the output results of the comparators added together and delivered to the comb filter. This comb filter acts to average all the signals received within a predetermined repetitive time interval. This information from the comb filter controls a weighting means which may similarly be a multiplier which receives the output signal from a respective comparator multiplier for delivery to an integrator which may be a narrow band filter. The narrow band filter may be quenched so that it provides an output signal responsive to the presence of an information signal by the build-up of a signal in the filter.

The reference signals which may be one or more signals are used to modify the carrier signal at the transmitter for producing the information signal to be propagated. The same reference signals are available at the receiver and the techniques utilized are those of correlation, wherein when a particular reference signal is present in the information signal, this will be detected by its correlation with the particular reference signal present at the receiver. The presence of a particular reference signal in the information signal results in the build-up of a signal in the integrator or narrow band filter, whereas the absence of such correlation results in no such build-up or indication. The system is exemplified and illustrated in connection with a Teletype system using wide band reference signals and requiring two reference signals, namely Mark and Space signals.

The method of the invention comprises periodically sampling of information signal, storing the sampled information for delivery during the predetermined time interval, combining the sampled information with the reference signal and storing the resulting combination signal for delivery in time sequenced order, combining the sampled information delivered during a predetermined interval with said combination signal and providing a weighted signal, and averaging the weighted signal produced over a period of time for deriving an information signal.

Figure 2:
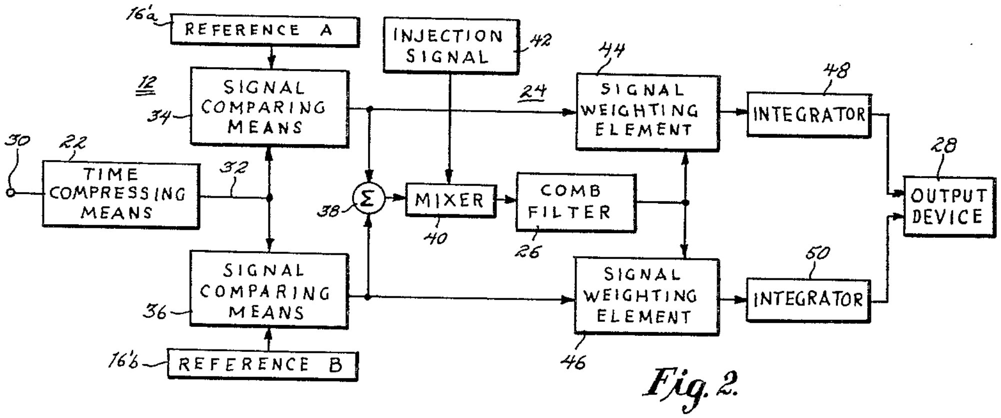
Figure 3:
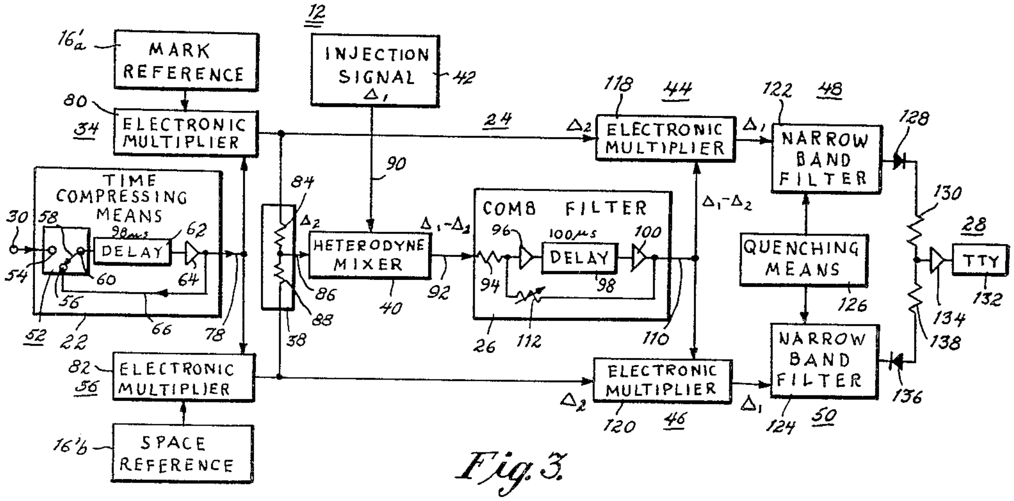
Figure 4:
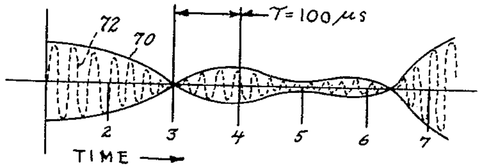
Figure 5:
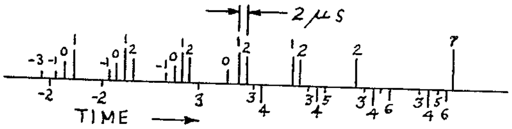
Figure 6:
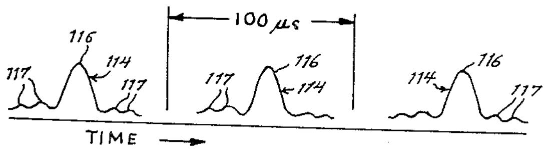
Figure 7:
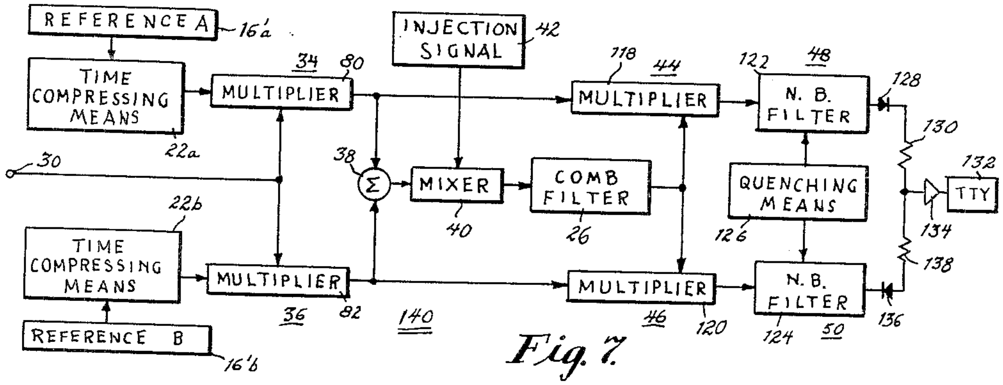
Figure 8:
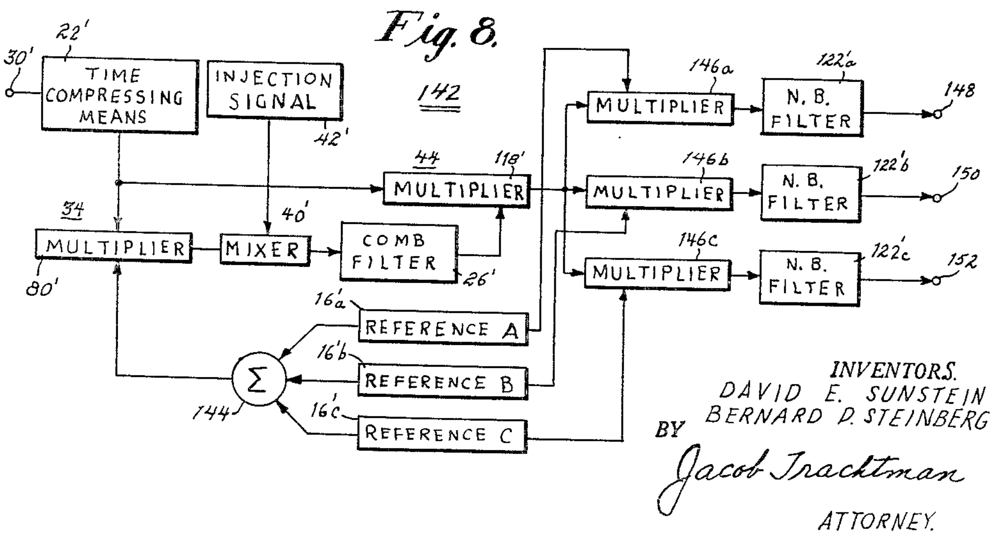

With the foregoing discussion in mind, this invention will be most readily understood from the following detailed description of a representative embodiment thereof, reference for this purpose being had to the accompanying drawings, in which:

FIGURE 1 is a block diagram representing a signal processing apparatus embodying the invention, FIGURE 2 is a block diagram showing in greater detail a portion of the apparatus shown in FIGURE 1, FIGURE 3 is a schematic representation showing in greater detail the apparatus of FIGURE 2, FIGURE 4 is a graphic representation of a signal delivered to the time compressing means of the apparatus, FIGURE 5 is a graphic representation indicating amplitude only of the complex samples provided by the time compressing means in the apparatus, FIGURE 6 is a diagrammatic presentation of the envelope of the multipath profile delivered by the comb filter of the apparatus, FIGURE 7 is a block diagram illustrating a modified form of the apparatus shown in FIGURE 2, and FIGURE 8 is another modified form of the apparatus shown in FIGURE 2.

Like numerals designate like parts through the several views.

The FIGURE 1 discloses a communication system 10 embodying the signal processing apparatus 12 of the invention. The communication system 10 includes a transmitter 14 provided with reference signals 16 and an input terminal 18. The transmitter may provide a radio frequency carrier signal which is modulated by a reference signal 16 in accordance with an information signal received on its terminal 18. If for example, the system is used for transmitting Teletype information, the information signal at terminal 18 will be in the form of the baud signal utilizing the combination of Mark and Space components. For this purpose, the reference signals 16 may comprise two reference signals, one representing the Mark component while the other represents the Space component. The reference signals may be of the type generated by the methods described on page 563 of the March 1958, Proceedings of the Institute of Radio Engineers aforesaid, and illustrated on said page in Figure 7. Thus, to provide the information signal, in a case where a mark is to be transmitted, one of the reference signals is used to modulate the transmitter carrier frequency, while when the space signal is to be transmitted, the other reference signal modulates the carrier signal to provide an information signal for transmission through the atmosphere, or intervening phase between transmitter and receiver.

The receiver 20 located at the receiving station derives the information signal which may have been affected by multipath and intersymbol distortion. The receiver 20 delivers its signal to a signal time compressing means 22 which takes momentary samples of the input signal at appropriate intervals, stores the signals, and delivers a plurality of such samples in the interval between input samples to a signal processing circuit 24. The signal processing circuit 24 is also provided with the identical pilot signal 16 present at the transmitter 14 but delayed in time equal to the maximum propagation time for the information signal from the transmitter to the receiver locations. The signal processing circuit 24 utilizes a comb filter 26 for storing information being processed in a time sequenced order. The signal processing circuit 24 delivers the signal to an output device 28 such as a Teletype machine which reproduces the information derived from the transmitter 14.

Refer now to FIGURE 2 which is a block diagram illustrating in greater detail the signal processing apparatus shown in FIGURE 1.

The signal delivered to the input terminal 30 of the time compressing means 22 is compressed in time so that the signal received during a predetermined period at terminal 30 is delivered during a much shorter period by the time compressing means 22 at its output line 32. The signal on output line 32 of the time compressing means 22 is delivered to respective inputs of signal comparing means 34 and 36. Although only two such comparing means 34, 36 are illustrated, any number may be utilized. Each of the signal comparing means 34, 36 is provided with a respective reference signal **16'*a*, 16'*b***, of the type described in connection with FIGURE 1.

The output signals from the comparing means 34, 36 are delivered to an adder 38 which delivers the combined output signals to a mixer 40. The mixer 40 also receives an injection signal 42 for delivering an output signal having a carrier frequency which is particularly suitable for receipt by the comb filter 26. The output signal from the comb filter 26 is delivered to signal weighting elements 44, 46 which also respectively receive the output signals from corresponding signal comparing means 34, 36. A signal weighting element 44, 46 is provided for each of the signal comparing means 34, 36, so that if, for example, five reference signals 16' are utilized, there would be five signal comparing means and five corresponding signal weighting elements. Each of the signal weighting elements 44, 46 delivers its output signal to a respective integrator 48, 50. The integrator 48, 50 delivers an output signal to the output device 28. When the information signal received by the input terminal 30 of the time compressor 22 includes the reference signal **16*a*, the integrator 48 delivers an output signal; while the integrator 50 delivers an output signal indicating the presence of a reference signal 16*b* on the terminal 30**.

Refer now to FIGURE 3, which is a schematic representation showing in greater detail the apparatus of FIGURE 2 which is particularly described in connection with teletyping apparatus.

The time compresing means 22 includes an electronic switch 52 diagrammatically represented by first and second input terminals 54, 56, and a contact arm 58 pivotally connected to an output terminal 60 for selectively contacting either of the terminals 54, 56. The electronic switch may be of any conventional type, well known in the art. The input terminal 54 of the switch 52 is connected to the signal input terminal 30, while the output terminal 60 is connected to the input of a delay element 62. The delay element 62 should be of high quality, such as the best available quartz delay lines. The output from the delay element 62 is received by an amplifier 64 which has its output connected by a feed back loop 66 to the terminal 56 of the electronic switch 52.

The time compressing means 22 operates as follows to produce an output signal which is compressed in time, and has the effect of producing an output signal which is equivalent to rapidly and cyclically sampling the signals which would be present at many taps, such as fifty taps along a delay line receiving the signal on the input terminal 30.

To produce this result, using a 10 kilocycle band width signal as an example, the arm 58 of the switch 52 is in its up position contacting the terminal 54 for delivering the signal on the input terminal 30 during a two micro-second period, while arm 58 is in its down position contacting the terminal 56 during the remaining ninety-eight micro-second period of a one hundred micro-second cycle. By this means a new sample is added to the signal circulating through the feed back loop 66, while the oldest signal circulating is lost. This is due to the fact that the oldest signal, which is to be replaced, is present at the terminal 56 while the arm 58 is contacting the terminal 54 and thereby is lost and replaced by the signal present on the terminal 54.

The frequency at which samples are taken is directly related to the band width of the information signal. The number of samples may be chosen in accordance with sampling theory to determine the minimum number of samples required to obtain the information present in the information signal.

FIGURE 4 illustrates the form of the envelope 70 of an information signal having a carrier 72 denoted by the dashed lines, and which is delivered to the input terminal 30 of the time compressing means 22. The FIGURE 5 is a graphic representation indicating amplitude only of the complex samples provided by the time compressing means which is delivered to the output line 78 of the amplifier 64.

FIGURE 5 shows seven groups of signals, each representing successive cycles of signals from the time compressing means 22. Each group, for simplicity, shows five signal samples instead of the fifty samples corresponding to fifty taps of a delay line. The numbers above or below each of the samples represent the time sequence or order in which the samples are taken by the switch 52. The first signal position on the right of each group is the first signal position of the cycle, with the signal positions being counted in the direction toward the left. Thus, in the first cycle shown in FIGURE 5, sample 1 is in position 1, while this sample 1 is in position 2, 3, 4 and so on in the succeeding cycles. In the second cycle represented by the second group of signals, the first position receives the second sample, which sample is precessed to the next succeeding positions to the left with each latter cycle or circulation of the groups of signals. In this manner, a new signal sample is added and an old signal is removed with each sampling operation, the new signal being placed in the first position while the previous samples take on the next higher signal position of the cycle, and the last signal is replaced by the new signal.

The signal on line 78 is delivered to the signal comparing means 34, 36, which respectively comprise electronic multipliers 80, 82. The electronic multipliers 80, 82 may be heterodyne mixers illustrated in the said article of Price and Green. The electronic multiplier 80 multiplies the signal received from line 78 by the mark reference signal **16'*a* and delivers its output signal through a resistor 84 to the input 86 of a heterodyne mixer 40. Similarly, the electronic multiplier 82 multiplies the time compressing means signal on line 78 with the space reference signal 16'*b* and delivers its output signal through the resistor 88 of the adder 38 to the input 86 of the heterodyne mixer 40**.

The heterodyne mixer 40, which may be similar to the multipliers 80, 82, receives an injection signal 42 at its input 90 and includes its necessary side band selecting filters for providing a carrier signal comprising the difference of the input signals at its output 92 suitable for receipt by the comb filter 26.

The signal delivered over line 92 is received through an input resistance 94 of the comb filter for exciting an input amplifier 96. Amplifier 96 delivers its signal to a delay element 98 which may be a high quality quartz crystal line with a delay period of 100 micro-seconds. The signal derived from the delay element 98 is amplified by the output amplifier 100 for delivery to the output line 110 of the comb filter 26, and through an adjustable resistor or impedance 112 to the input of the amplifier 96. The amplifiers 96, 100, delay element 98, and impedance 112 constitute a signal loop around which the signals introduced over line 92 circulate. The signals on line 92 are continually being added to the recirculating signals in such a manner as to provide an average value for the signals introduced. The effect of the incoming signal 92 on the circuating signals of the comb filter depends upon the feed back provided by the impedance 112. The feed back is almost but less than unity and can be controlled by the variable impedance 112 so as to adjust the decay rate for information circulating in the filter loop. The greater the decay rate, the greater effect will the incoming signal have upon the signals circulating in the filter.

Consideration will now be given to the nature of the signals circulating in the comb filter. Signals circulating in the electronic comb filter may be considered to correspond to 50 samples related to the 50 samples delivered by the time compressing means 22 at its output line 78 over the 100 micro-second cycle period. The first signal position of the 50 signals delivered by the time compressing means 22 of the output line 78 will be considered that derived when the electronic switch 52 is sampling the signal on the input terminal 30. This signal, upon reaching the output line 78, is multiplied by the mark and space reference signals **16'*a*, 16'*b* respectively, summed by the adder 38 and delivered through the mixer 40 to the first signal position of the 100 micro-seconds delay path provided by the delay element 98 of the comb filter 26. Since the electronic switch 52 takes samples of the signal on the input terminal 30 every 100 micro-seconds, this is the rate at which these signals are delivered on the output line 78. This results in the sequential delivery of corresponding signals to the line 92 of the comb filter 26 at 100 micro-second intervals after appropriate multiplying and adding and mixing operations. Since the first position signal sample is returned through the impedance 112 after 100 micro-seconds it periodically arrives at the same time that the first position signals from the time compressing means 22 are delivered at the input line 92 of the comb filter 26, and are added continually to the circulating signal present at this particular signal position. Generally, the second position signal, provided by the time compressing means 22, which may be considered the signal appearing at the terminal 56 right after the sampling of the signal on the terminal 54, are similarly added to such signals which are caused to circulate in the second position of the comb filter 26. Thus, the signals circulating in the comb filter, which in this case correspond to 50 signal samples, each constitute the sum of respective signals from correspondingly numbered signal positions delivered from the cyclic output signals from the time compressing means 22**.

Since each signal of the cycle of signals delivered by the time compressing means 22 corresponds to the signals received at a predetermined tap of a delay line with the taps corresponding to the signal position number, the correlations of such signals with a reference signal, such as the mark or space reference signals **16'*a*, 16'*b*, are obtained by multiplying same in the multipliers 80, 82 adding together the concurrent products of the signals from the several multipliers 80, 82. Resultant signals from the adder 38 are continually added to previous signals delivered at 100 micro-second intervals by being delivered to respective particular signal positions of the circulating signals in the comb filter 26. If there is a correlation between the input signals on terminal 30 with a mark or reference signal 16'*a*, 16'*b***, this will result in a cumulative increase in the signal circulating in the comb filter corresponding to one or more of the particular signal position numbers. If there is no correlation, then the signals will be arbitrarily positive and negative resulting in no cumulative positive signal.

Thus, if there is a correlation between the first, seventh, fifth, twentieth, twenty-seventh signal positions, these corresponding intervals in the comb filter will have a signal circulating therein with an amplitude corresponding to the degree of correlation.

Let us assume for the moment that an information signal is being received at the terminal 30 comprised of the combination of five super-imposed signals, each delayed from the other by a predetermined period with a total period not greater than a predetermined value which is the maximum propagation delay to be considered.

The mark and space reference signals 16'*a*, 16'*b* are delayed with respect to the corresponding reference signal 16 at the transmitter 14 (see FIGURE 1) by a period equal to the longest propagation delay time to be considered plus the 98 micro-second delay of the delay element 62 of the time compressing means 22. Thus, if the first signal sample derived from the time compressing means 22 provides a correlation product when multiplied by the mark reference signal 16'*a*, a positive cumulative correlation product results in the comb filter 26 in the first signal position. This indicates that a mark reference signal is being received at the input terminal 30, which has a delay equal to the maximum delay through the propagating medium considered by the apparatus. Similarly, if the signals of the first position of the 50 signal positions delivered by the time compressing means 22 also provides a positive correlation product, this indicates that the mark reference signal 16'*a* is present at the input terminal 30 but arrives after a shorter delay via another path through the ionosphere. The presence of such a positive correlation signal in the comb filter for the last signal position similarly indicates the receipt of a signal over a path providing the shortest possible delay which is considered by the apparatus.

Thus, the signals circulating and built up in the comb filter 26 provide an envelope showing the state of the ionosphere, that is, the amplitude of the signals corresponding to the mark reference signal 16'*a* which are combined on the input terminal 30 but arriving at different delay times over multi-paths thru the ionosphere. The relative amplitudes of the signals in the various signal positions circulating in the comb filter 26 gives the relative strength of the various multi-path signals received at the input terminal 30.

FIGURE 6 diagrammatically represents the envelope of the signals circulating in the comb filter 26 extending over a period of 100 micro-seconds. The envelope 114 of the signals is a representation of the multi-path profile provided by the ionosphere, the profile being subject to change with changing multi-paths and transmitting characteristics of the ionosphere. The profile shown by the envelope 114 of FIGURE 6 illustrates the presence of a major path through the ionosphere by the peak 116 and a number of minor multi-paths illustrated by the smaller peaks 117. The rate at which this pattern or profile may be allowed to change can be controlled by adjusting the value of the variable impedance 112 to provide a loop gain very close to unity and to a lower value for decreasing the contribution of the circulating signal with relation to the new signals being introduced on the input line 92 of the comb filter 26. If the feed back signal through the impedance 112 is increased, approaching unity, rapid and minor fluctuations in the condition of the ionosphere will not substantially affect the profile envelope 114 of the circulating signals. The feed back signal from the comb filter can be sufficiently reduced, however, so that the profile or envelope 114 is affected by the incoming signal over a period which is short enough to allow the profile or envelope 114 to substantially correspond to the actual condition of the transmitting or propagating medium, but yet without being responsive to highly transient and erratic phenomena.

If the information signal received at the input terminal 30 is an information signal corresponding to the space reference signal 16'*b*, the apparatus will respond in an identical manner to provide the profile or envelope 114 of the signals in the comb filter 26 related to the condition of the multi-paths through the ionosphere. In this case, however, the electronic multiplier 82 will supply output signals showing the correlations with the signals received at the terminal 30, while there will be no correlation signals produced in the comb filter as the result of the output signals supplied by the electronic multiplier 80 which is excited by the mark reference signals 16'*a*. Since propagation properties through the atmosphere is identical for the delivery of mark or space reference signals 16'*a*, 16'*b*, the cumulated correlation signals circulating in the comb filter 26 will provide a profile which also represents the ionospheric transmission delays over the multi-paths, which is not a characteristic of whether a mark or space signal is being received.

An object of the apparatus, however, is to determine whether a mark or space signal is being received by the terminal 30, even though the information signal received upon this terminal may be distorted due to the condition of the ionosphere. The determination of whether a mark or space reference is being received is achieved as follows.

The product signals from the multipliers 80 and 82 are also delivered to respective signal weighting elements 44, 46. The weighting elements 44, 46 may be electronic multipliers 118, 120 which also receive the output signals on line 110 from the comb filter 26. Each of the multipliers 118, 120 act as weighting means since the amplitude of the signal which is delivered from its respective multiplier 80, 82 is multiplied by the correlation signal provided by the comb filter 26. The output signals from the weighting means or multipliers 118, 120 are respectively delivered to integrators 48, 50 respectively, in the form of narrow band filters 122, 124.

In the event that the information signal 30 is modulated by a mark reference signal 16'*a*, the product signals from the multiplier 80 delivered through the multiplier 118 will be additive to produce a positive sum signal in the integrator 48. This means that the signal in the narrow band filter 122 will build up in time to provide an output signal of substantial amplitude. On the other hand, the signals delivered by the multiplier 82 and also passed by the multiplier 46 to its respective band filter 124 will not provide a positive correlation sum with the build up of the signal in its filter 124. Therefore, to restrict the integration time to the interval of the baud in determining whether a mark or space signal is being transmitted and received at the input terminal 30, a quenching means 126 is provided which is timed by the baud signals of the Teletype system to periodically quench the narrow band filters 122, 124, and to permit the delivery of an output signal from either of the filters 122, 124. If a mark reference signal is being received at the input terminal 30, the amplitude of the signal in the narrow band filter 122 builds up to substantial value and is periodically transmitted through a rectifying means 128 and resistor 130 to a Teletype instrument 132 through its input amplifier 134. The direction in which the means 128 is poled provides a positive rectified signal allowing the Teletype instrument 132 to identify the received signal as a mark signal. Similarly, if a space reference signal 16'*b* is delivered to the input terminal 30, the narrow band filter 124 builds up the amplitude of the signals therein to a sufficient degree between quenching periods to provide a signal through the rectifier 136 and resistor 138 to the Teletype instrument 132. This signal is of a negative polarity because of the poling of the element 138 and its resulting rectifier action. Thus, the delivery of a positive signal to the Teletype instrument 132 indicates the receipt of a mark signal at the input terminal 30, while delivery of a negative signal corresponds to the receipt of a space reference signal.

Although the FIGURE 3 is particularly adapted for use with a Teletype system in which two reference signals 16'*a* and 16'*b* are utilized to modify the carrier signal, it is readily evident that a system may be provided with any number of reference signals, the presence of any of which produces an output signal at respective output terminals. Similarly, it is not necessary to modulate the carrier signal with one reference signal at a time but a plurality of such reference signals may be used for simultaneously modulating the carrier, thereby resulting in the simultaneous production of output signals at respective output terminals of the apparatus.

The quenching means 126 by periodically quenching the narrow band filters 122, 124, conditions them for the receipt of new product signals from their respective multipliers 118, 120, thereby reducing the time necessary in order to determine the presence of a new reference signal at the input terminal 30. Since signals are delivered at a predetermined rate for modulation of the carrier signal by the baud signals, this rate is utilized by the quenching means 126 for clearing the filters 122, 124 for the receipt of information and while allowing sufficient time for the build up of a signal in the filters responsive to the input signal from their respective weighting elements 44, 46.

The electronic multipliers 118, 120 may also be provided with filter means for selecting the carrier signal of the injection signal 42. This allows the narrow band filters 122, 124 to be provided with a narrow band pass characteristic at the frequency of the injection signal 42, which is not dependent upon the carrier frequency of the information signal delivered to the input terminal 30.

In summary, the processing apparatus provides means for deriving in an accurate and highly reliable manner information present in signals received which have been affected by distortion resulting from multi-path propagation through a transmitting medium. The signal processing apparatus 12 utilizes multiplexing techniques for correlating the signals which arrive along the various paths with locally generated reference signals identical to those from which the mark and space selection is made at the transmitter. The cross correlation products are optimumly weighted and combined coherently in a comb filter using a quartz delay line in a closed, positive feed back loop, to provide a profile of the propagation medium for appropriately weighting the correlation products. This also provides the maximization of the output signal to noise ratio while reducing the components and circuitry required in prior art devices utilized for achieving this result. The long, tapped delay line of the prior art device described in the Price and Green article is replaced by a short delay line with a positive, closed feed back look which produces a wave form which is the same as would be obtained from a tapped delay line if 50 taps were sampled by a repetitive sampling switch with a cycle time equal to 100 micro-seconds. The comb filter provides an integrator which separately sorts and properly combines the correlation products for different displacements, providing an envelope corresponding to the profile of the condition of the ionsphere used for weighting the correlation products from the respective multiplier units.

FIGURE 7 is a block diagram illustrating an apparatus 140 which is a modified form of the apparatus 12 of FIGURE 3.

The signal processing apparatus 140 of FIGURE 7 is identical to the apparatus 12 of FIGURE 3 except that the information signal received by the input terminal 30 is delivered directly to the inputs of the multipliers 80 and 82, while the reference signals **16'*a*, 16'*b* are delivered to the inputs of respective time compressing means 22*a*, 22*b*. The outputs from the time compressing means 22*a*, 22*b* are respectively delivered to the multipliers 80, 82. With this arrangement the products delivered by the multipliers 80, 82 are processed by the remainder of the apparatus 140 in a manner identical to that described in connection with the apparatus 12** of FIGURE 3 to produce similar results.

FIGURE 8 is an apparatus 142 which is another modified form of the apparatus 12 of FIGURE 3.

The apparatus 142 of FIGURE 8 receives an input informaton signal upon its terminal 30' which is delivered to a time compressing means 22'. The time compressing means 22' delivers an output signal to a multiplier 80' which also receives a sum of a plurality of reference signals **16'*a*, 16'*b* and 16'*c* from an adder 144. The product signal from the multiplier 80' is delivered to a mixer 40' which is also energized by the injection signal 42'. The output from the mixer 40' is received by a comb filter 26' which delivers its output signal to a weighting element 44 in the form of a multiplier 118'. The multiplier 118' also receives the output signals from the time compressing means 22' and delivers weighted output signals to a plurality of terminal multipliers 146*a*, 146*b*, and 146*c*, each of which respectively receives a corresponding reference signal 16'*a*, 16'*b* and 16'*c***.

The output signals from the multipliers **146*a*, 146*b* and 146*c* are respectively delivered to integrators or narrow band filters 122'*a*, 122'*b*, 122'*c*. The signals from the narrow band filters are respectively delivered to output terminals 148, 150 and 152 for indicating respectively the presence of corresponding reference signals 16'*a* ,16'*b*, 16'*c* at the input terminal 30'**.

The apparatus 142 may utilize similar components to those disclosed in connection with FIGURE 3 as indicated by the primed reference numerals for producing the identical results by the utilization of the multiplexing techniques described in connection with the apparatus 12. In this case, instead of using a plurality of multipliers 80', one for each of the reference signals 16', as done in the apparatus 12, a single multiplier 80' is utilized, while a plurality of multipliers 146 are required for the respective reference signals 16' for obtaining respective output signals at the terminals 148, 150, 152 indicating the presence of corresponding reference signals at the terminal 30'.

While the invention has been described and illustrated with reference to several embodiments, it will be understood that the invention is capable of various modifications and applications, not departing essentially from the spirit thereof, which will become apparent to those skilled in the art.

What is claimed is:

1. Signal processing apparatus comprising a source of signals, signal time compressing means receiving signals from said source, and a signal processing circuit including a comb filter means, said signal processing circuit receiving signals from said compressing means and delivering an output signal, said comb filter means comprising a signal delay element having an input lead and an output lead and a positive feedback loop for delivering a predetermined portion of the signal on the output lead of said element to its input lead.

2. Signal processing apparatus comprisng first and second sources of information signals; signal time compressing means for receiving signals from said first source and delivering output signals; and a signal processing circuit including a signal comparing means receiving output signals from said compressing means and signals from said second source, and a comb filter means receiving signals from said comparing means for providing an output signal, said comb filter means comprising a signal delay element having an input lead receiving signals from said comparing means and an output lead and a positive feedback loop for delivering a predetermined portion of the signal on the output lead of said element to its input lead.

3. Signal processing apparatus comprising: first and second sources of information signals; a signal time compressing means having an input line receiving signals from said first source, a signal delay element having an input lead and an output lead, and switching means normally connecting the output lead with the input lead of said delay element and periodically connecting said input line with said input lead; and a signal processing circuit receiving signals from said second source and including a signal comparing means receiving signals from said compressing means and from said second source and a comb filter means receiving signals from said comparing means for providing an output signal, said comb filter means comprising a signal delay element having an input lead receiving signals from said comparing means and an output lead and a positive feedback loop for delivering a predetermined portion of the signal on the output lead of said element to its input lead.

4. The apparatus of claim 3 including a signal weighting means controlled by signals from said filter means for delivering an output signal derived from said comparing means.

5. The apparatus of claim 3 including a signal weighting means controlled by signals from said filter means for delivering an output signal from said compressing means.

6. Signal processing apparatus comprising a signal source providing a plurality of reference signals, signal time compressing means for receiving information signals and delivering output signals, and signal correlating means receiving output signals from said compressing means and said reference signal source and delivering an output signal, said correlating means including a signal multiplier unit for each of said reference signals for receiving signals from said compressing means and a respective one of said reference signals and delivering an output signal, and a comb filter means concurrently receiving said output signals from said multiplier units.

7. The apparatus of claim 6 including a signal weighting element for each of said multiplier units for receiving signals from said filter means and a respective one of said multiplier units and delivering an output signal.

8. The apparatus of claim 7 including a signal integrating means for each of said weighting elements receiving signals from a respective one of said elements and delivering an output signal.

9. The apparatus of claim 8 in which said integrating means is a periodically quenched narrow band filter, and includes an output device receiving signals from said integrating means and delivering an information signal.

10. Signal processing apparatus comprising a signal source providing a plurality of reference signals, a signal time compressing means for each reference signal of said source receiving a respective one of said reference signals and delivering an output signal, and a signal correlating means receiving output signals from said compressing means and from a source of information signals and delivering an output signal, said correlating means including a signal multiplier unit for each of said compressing means for receiving signals from a respective one of said compressing means and from a source of information signals and delivering an output signal, and a comb filter means concurrently receiving said output signals from said multiplier units.

11. Signal processing apparatus comprising a plurality of signal sources each providing an independent reference signal, signal time compressing means for receiving information signals,, signal adding means receiving said reference signals and delivering a composite output signal and a signal correlating means including a signal multiplier unit receiving signals from said compressing means and from said adding means and delivering an output signal and a comb filter means receiving said output signal from said multiplier unit.

12. In a receiver for a signal having sequential signal elements, each occupying a frequency spectrum of predetermined width and each subject to transmission delays up to a given maximum: means for taking a plurality of discrete samples of said signal within a time period shorter than the reciprocal of said spectrum; means for producing a first signal representing the degree of correlation between said plurality of signal samples and a reference signal having sequential signal elements analogous to those of said received signal but free from said transmission delays; means for producing a second signal representing the average of said first signal over a time period substantially longer than said reciprocal of said spectrum; means for modifying said first signal in accordance with variations in said second signal; and means for integrating said modified signal over a time period substantially equal to the duration of one of said signal elements.

13. The apparatus of claim 12 characterized in that said means for producing said first signal comprises means for heterodyning said signal with said reference signal samples and means for selectively deriving from said heterodyning means one of the heterodyne components produced by said last-named means.

14. The apparatus of claim 12 characterized in that said modifying means comprises means for heterodyning said first and second signals.

15. The apparatus of claim 14 characterized in that said integrating means comprises a filter supplied with the output from said heterodyning means and selectively transmissive only of different frequency heterodyne components in said output, and means for establishing the signal transmitted by said filter at a predetermined reference value at the end of each said signal element period.

16. In a receiver for a signal having sequential signal elements each occupying a frequency spectrum of predetermined width and each subject to transmission delays up to a given maximum: means for taking a plurality of discrete samples of said signal within a time period shorter than the reciprocal of said spectrum; means for producing a first signal representing the degree of correlation between said plurality of signal samples and a reference signal having sequential signal elements analogous to those of said received signal but free from said transmission delays; means for producing a second signal representing the average of said first signal over a time period substantially longer than said reciprocal of said spectrum, said last named means comprising a signal recirculating loop having a recirculating period substantially equal to said reciprocal of said spectrum and having a gain less than unity around said loop; means for modifying said first signal in accordance with variations in said second signal and means for integrating said modified signal over a time period substantially equal to the duration of one of said signal elements.

17. Signal processing apparatus comprising first and second sources of information signals; signal time compressing means for receiving signals from said first source and delivering output signals; and a signal processing circuit including a signal comparing means receiving output signals from said compressing means and signals from said second source, a comb filter means receiving signals from said comparing means for providing an output signal, a signal weighting element controlled by said output signal from said filter means for delivering output signals from said compressing means, an integrating means, and a second comparing means receiving output signals from said element and signals from said second source and delivering an output signal to said integrating means to provide an information output signal.

References Cited in the file of this patent

UNITED STATES PATENTS

| | | |
|---|---|---|
| 2,465,840 | Blumlein | Mar. 29, 1949 |
| 2,645,770 | Veaux | July 14, 1953 |
| 2,840,308 | Van Horne | June 24, 1958 |
| 2,855,573 | Fredendall | Oct. 7, 1958 |
| 2,914,666 | Derovet | Nov. 24, 1959 |
| 2,926,243 | Camp | Feb. 23, 1960 |
| 2,958,039 | Anderson | Oct. 25, 1960 |
| 2,982,853 | Price et al. | May 2, 1961 |

OTHER REFERENCES

Article, "Communications Technique for Multipath Channels," Price and Green, Proceedings of the I.R.E. March 1958, pp. 555–570.